United States Patent [19]
Schaede et al.

[11] Patent Number: 5,724,150
[45] Date of Patent: Mar. 3, 1998

[54] METHOD AND APPARATUS FOR MEASURING A POSITION OF WEBS OR SHEETS

[75] Inventors: Johannes Georg Schaede; Volkmar Rolf Schwitzky, both of Würzburg, Germany

[73] Assignee: Koenig & Bauer-Albert Aktiengesellschaft, Wurzburg, Germany

[21] Appl. No.: 570,522

[22] Filed: Dec. 11, 1995

[30] Foreign Application Priority Data

Dec. 10, 1994 [DE] Germany ............... 44 44 080.4
Aug. 31, 1995 [DE] Germany ............... 195 32 009.3

[51] Int. Cl.⁶ ................................................ G01N 21/84
[52] U.S. Cl. .............. 356/429; 250/559.12; 250/559.36
[58] Field of Search ........................... 356/237, 429, 356/430; 250/559.16, 559.17, 559.18, 559.36, 559.12

[56] References Cited

U.S. PATENT DOCUMENTS

| | | | |
|---|---|---|---|
| 3,696,249 | 10/1972 | Bowker | 250/559.36 |
| 3,843,264 | 10/1974 | Josse et al. | 356/429 |
| 3,989,387 | 11/1976 | Hategan | 356/430 |
| 4,004,153 | 1/1977 | Obser et al. | 356/430 |
| 5,471,066 | 11/1995 | Hagiwara | 356/237 |

FOREIGN PATENT DOCUMENTS

| | | | |
|---|---|---|---|
| A-0314521 | 5/1989 | European Pat. Off. | |
| 58-062504 | 4/1983 | Japan | |
| 2242033 | 5/1990 | United Kingdom | 356/237 |

*Primary Examiner*—Frank G. Font
*Assistant Examiner*—Zandra V. Smith
*Attorney, Agent, or Firm*—Jones, Tullar & Cooper, P.C.

[57] ABSTRACT

The position of the edges of a web or sheet is determined by using an optical system in conjunction with a photoelectric receiver. The location of the sheet or web edge can be measured accurately even if the edge has various anomalies. The optical system provides different images of the web or sheet edge in two directions.

19 Claims, 3 Drawing Sheets

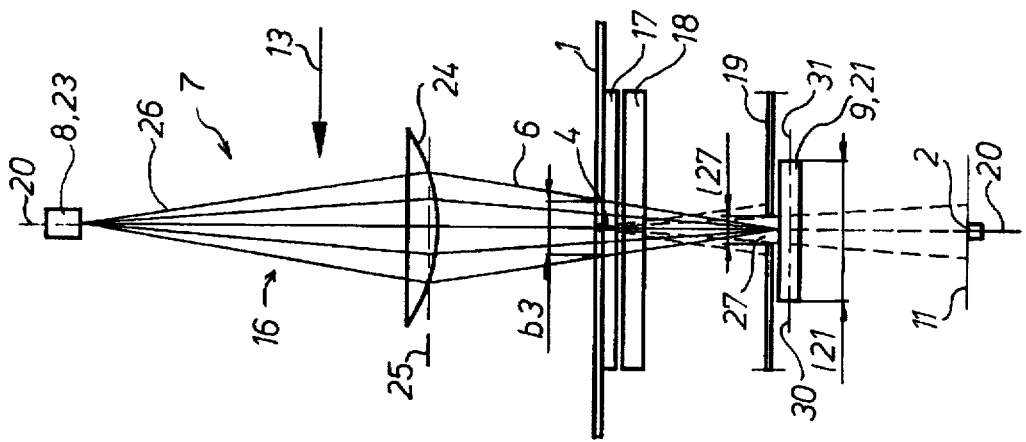
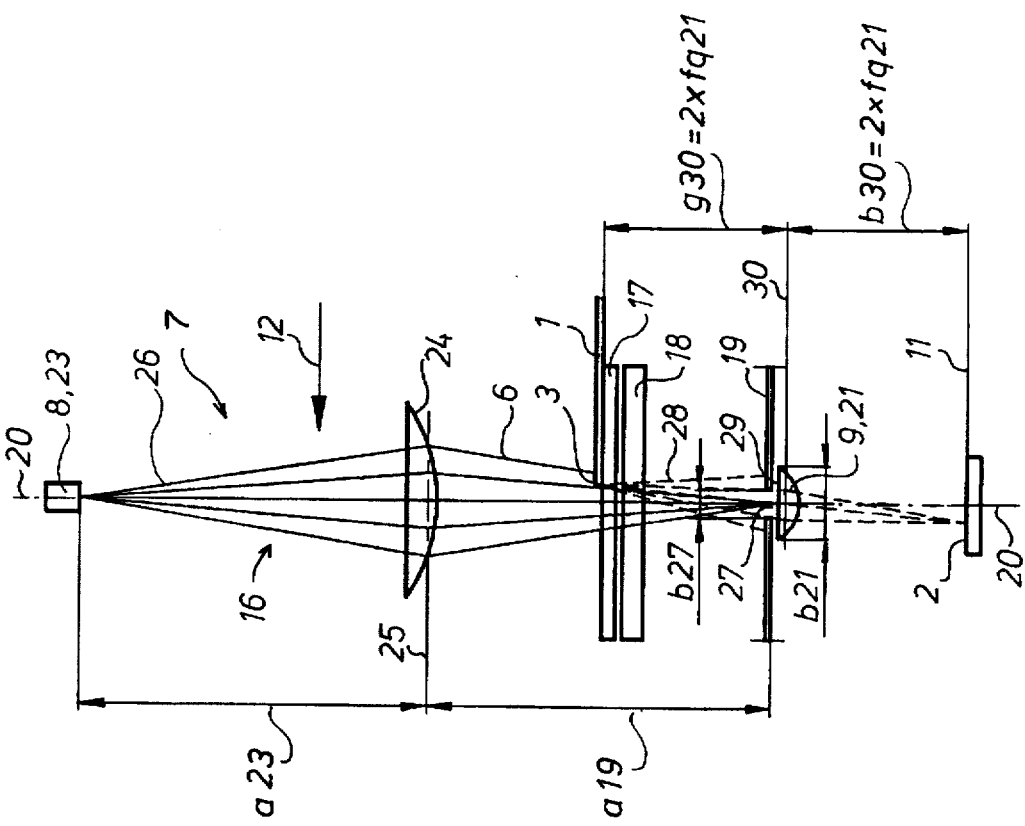

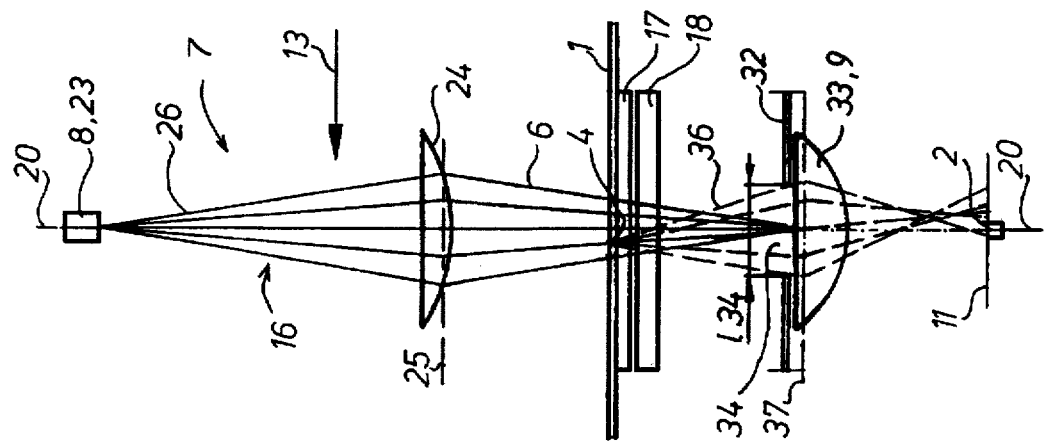
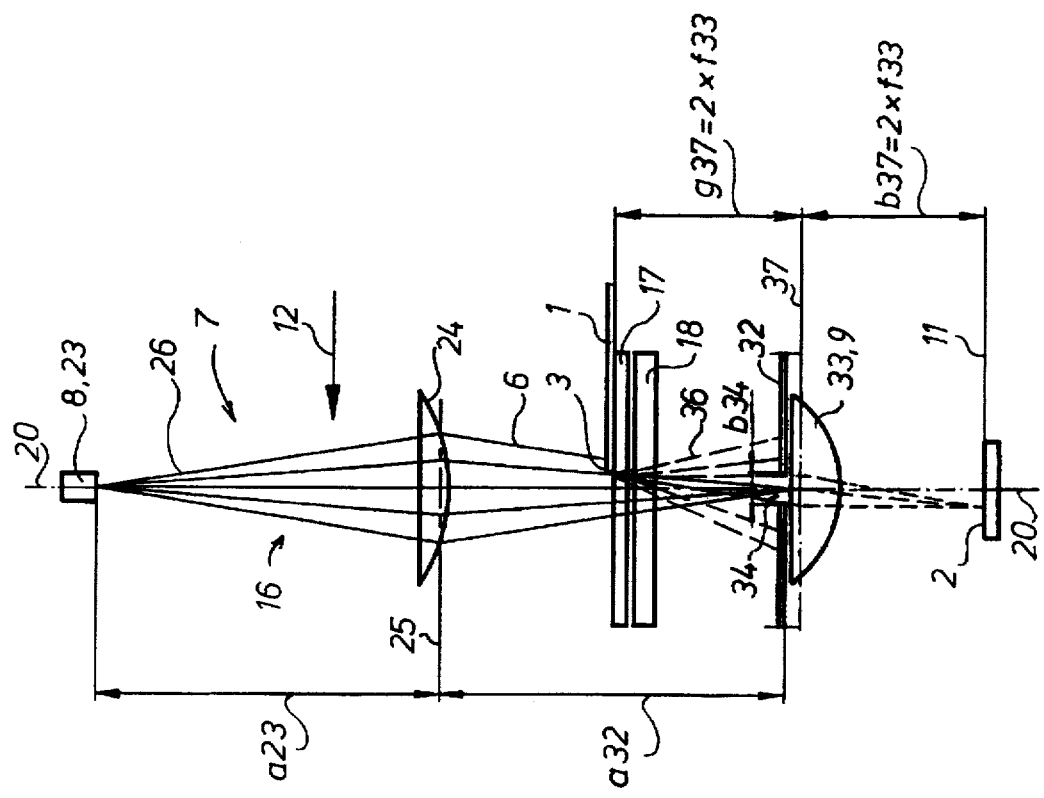

METHOD AND APPARATUS FOR MEASURING A POSITION OF WEBS OR SHEETS

FIELD OF THE INVENTION

The present invention is directed generally to a method and apparatus for measuring a position of a web or sheet. More particularly, the present invention is directed to a method and apparatus for using a photoelectric measuring device to locate the edge of a web or a sheet. Most specifically, the present invention is directed to a method and apparatus for locating a position of an edge of a web or a sheet having edge anomalies. The web or sheet edge is supported between a light source and a photoelectric receiver which form a portion of an optical system. The light source uses an upper condenser to form an upper light beam bundle. This upper light beam bundle strikes the edge of the sheet or web. The portion of the light beam bundle not stopped by the web or sheet passes through a diaphragm opening and through a lower imaging lens. The edge of the web is clearly defined on the photoelectric receiver in a first or transverse imaging plane extending in the direction of a transverse axis extending perpendicular to the edge of the web. The edge of the web is represented in a diffused and blurred fashion in the direction of a second or longitudinal imaging plane extending in the longitudinal axis extending parallel with the edge of the web.

DESCRIPTION OF THE PRIOR ART

In the field of printing, it is very important to be able to precisely locate and measure the position of a web or sheet that will be printed, or that has been printed in a first printing couple and that will be subsequently printed in a second printing couple. Accurate registration of the printing requires that the location of the web or sheet be accurately measured. Such a measurement must be taken frequently and thus it is also important that the measuring apparatus be capable of being operable in an efficient and dependable manner.

In the German Published, Non-Examined Patent Application No. DE-OS-22 02 087, there is disclosed a measuring system for the photoelectric measurement of a position of sheet edge with respect to a reference line. This prior device uses light emanating from an illuminating device with this light being received by a photoelectric receiver. A video signal is generated with this video signal corresponding to the position of the edge of a sheet that has been inserted between the illuminating device and the receiver. The photoelectric receiving element that is used in this prior device consists of a plurality of individual photoelectric elements that are arranged adjacent each other and that are positioned on behind the other.

A significant limitation of this prior art device is its inability to differentiate between the edge of the sheet or web and some type of anomaly on the edge. Even the smallest damage to the edge of the sheet or web, or the projection of a fiber beyond the sheet edge will result in a faulty measurement of the location of the edge of the sheet or web. Each such edge projection, edge tear or projecting fiber or thread will result in an incorrect measurement or determination of the position of the sheet or web edge since each of these edge anomalies can be sensed by the measuring apparatus. If each incorrect web edge sensing event results in a press shut down, it will be readily apparent that such a system cannot be used.

A need exists for a method and for a suitable apparatus for use in determining the position of an edge of a web or sheet which will not be rendered ineffective by various edge anomalies. The method and apparatus for measuring a position of webs or sheets in accordance with the present invention provides such a device and is a significant improvement over the prior art.

SUMMARY OF THE INVENTION

It is an object of the present invention to provide a method and apparatus for measuring a position of webs or sheets.

Another object of the present invention is to provide a method and apparatus for using a photoelectric measuring device to locate the edge of a sheet or web.

A further object of the present invention is to provide a method and apparatus for measuring the position of a sheet or web having web edge anomalies.

Still another object of the present invention is to provide a method and apparatus for using a photoelectric receiver with a plurality of photoelectric elements to locate the edge of a sheet or web despite the existence of web edge anomalies such as small web segments or fibers extending beyond the edge of the web.

As will be discussed in detail in the description of the preferred embodiments which is presented subsequently, the edge of the sheet or web whose position is to be detected is supported on an object holder above a diaphragm having an opening of a defined length and width. A light source and an upper light condenser are placed above the object holder. This upper light source and upper light condenser form a bundle of light rays. These light rays will pass through the diaphragm opening beneath the object holder and will be focused by a lower imaging lens. These focused light beams, in the form of a focused bar or beam of light, are received by a photoelectric device that has a length and a width which are less than that of the diaphragm opening. An edge of a web or sheet which is supported by the object holder is positioned in the path of the cylinder shaped upper light beam bundle. Only those light beams not striking the sheet or web will pass through the diaphragm opening and be focused on the photoelectric device. Minor edge anomalies will interfere with the passage of a portion of the beam of light but will not stop the passage of the entire beam. Thus, while the intensity of the focused light beam striking the photoelectric device may be slightly diminished by the presence of the web edge anomalies, it will still be substantially greater that the light received by that portion of the photoelectric device blocked by the sheet or web. Thus an accurate measurement of the location of the sheet or web will be obtained which will not be affected by these minor edge anomalies. The light image of the web will be made diffused and blurred in the longitudinal axis extending parallel to the edge of the web. The light image of the web will be made very sharp in the transverse axis perpendicular to the edge of the web.

So long as the web or sheet edge anomalies are small in width with respect to the width of the opening in the diaphragm which underlies the object holder, the light in the light beam bundle will not be significantly reduced in strength. The portion of the light which passes through the diaphragm opening and is then focused by the imaging lens into the focused bar of light that strikes the photoelectric receiver will still be substantially greater in strength than the ambient light that may be received by the portion of the photoelectric device underlying the web or sheet. The photoelectric receiver is used to generate an analog video signal. The amplitude of the video signal from the portion of the photoelectric device not covered by the web is so much greater than the signal from the covered portion that the inclusion of edge anomalies on the edge of the web or sheet will not adversely affect the accuracy of the measurement of the position of the web or sheet provided by the device.

Various anomalies at the edge of the sheet or web, such as paper fibers, ragged cut edges, edge tears and the like will not hamper the operation of the device. Even if the anomaly is greater in width that the width of the photoelectric receiver, it will not create an inaccuracy, so long as the width of the anomaly is not greater that the width of the diaphragm opening. While these anomalies will reduce the light intensity, they will not adversely affect the readings of the photoelectric receiver, as was the case with the prior art devices. The electronic evaluation device can still determine the exact position of the edge of the web or sheet in spite of the difference in light intensity resulting from the existence of web or sheet edge anomalies.

Another particular advantage of the present invention is that it is possible, in accordance with the method of the invention, to evaluate not only an area of the edge corresponding to the width of the photoelectric receiver but to also evaluate an area of the edge of the web considerably greater that the width of the photoelectric receiver. The area of the web edge evaluated may be greater that the width of the photoelectric receiver by a factor of between, for example 50 and 1000. The measuring accuracy of the present invention is considerably increased by this. The various components used in the present invention are generally standard or conventional parts which are not particularly expensive.

The method and apparatus for measuring a position of webs or sheets in accordance with the present invention overcomes the limitations of the prior art. It is substantial advance in the art.

BRIEF DESCRIPTION OF THE DRAWINGS

While the novel features of the method and apparatus for measuring a position of a web or sheet in accordance with the present invention will be set forth with particularity in the appended claims, a full and complete understanding of the invention may be had by referring to the detailed description of the preferred embodiments which is presented subsequently, and as illustrated in the accompanying drawings, in which:

FIG. 3 is a schematic side elevation view of a first preferred embodiment of the apparatus in accordance with the present invention and taken in the direction of a transverse axis of the web;

FIG. 4 is a view generally similar to FIG. 3 and taken in the longitudinal axis of the web;

FIG. 5 is a schematic side elevation view of a second preferred embodiment of the apparatus in accordance with the present invention and taken in the direction of a transverse axis of the web; and FIG. 6 is a schematic side elevation view generally similar to FIG. 5 and taken in the longitudinal axis of the web.

DETAILED DESCRIPTION OF THE PREFERRED EMBODIMENTS

Figure 1:
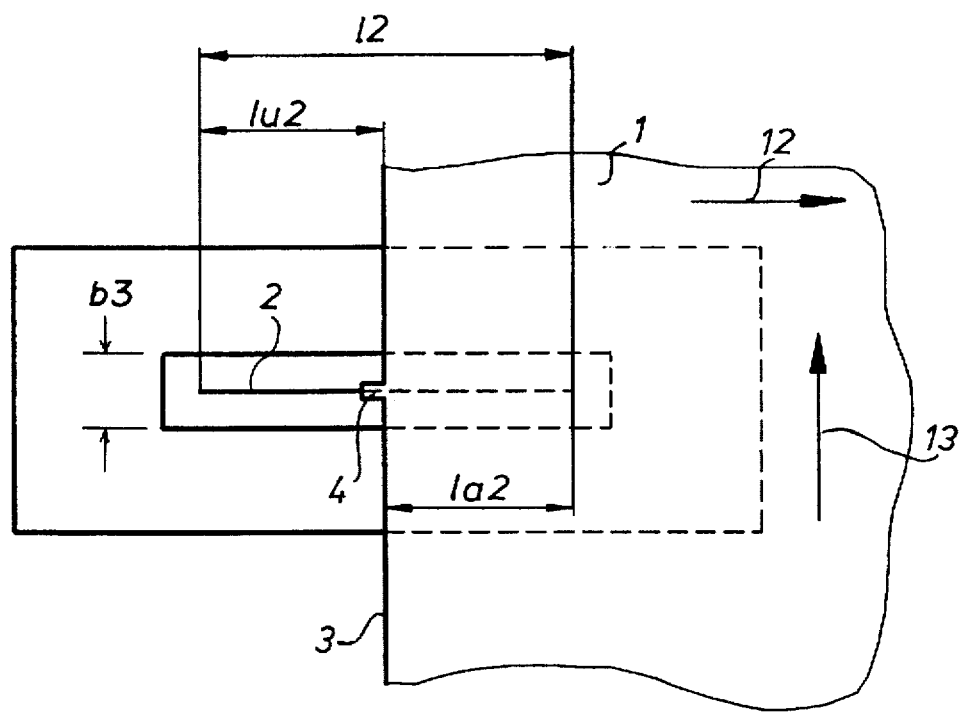
FIG. 1 is a schematic top plan view of a portion of a sheet or web whose position is to be measured and showing a photoelectric receiver in accordance with the present invention.

Referring initially to FIG. 1 and taken in conjunction with FIGS. 3 and 4, there may be seen a first preferred embodiment of a device for measuring the position of a web or sheet, generally at 1, in accordance with the present invention. Web or sheet 1 is provided with an edge 3 which extends as a generally straight line at least with in the limits of the measuring range of the subject invention. A photoelectric receiver, generally at 2, is positioned beneath the web or sheet 1, as seen in FIGS. 1 and 3–6, and is used to determine the location or position of the edge 3 of the sheet or web 1. The web or sheet 1 is essentially light-absorbent. In the remainder of the description of the preferred embodiment, web or sheet 1 will be referred to as web 1. Web or sheet 1 is preferably a paper web or a paper sheet that is being used in a rotary printing press. However, it is to be understood that web 1 is not to be so limited and could be any other material in the shape of a web, sheet, or panel, such as sheet metal or foil. The designation of this web or sheet as web 1 hereinafter will be primarily for the sake of simplicity.

As may be seen in FIG. 1, web 1 has an edge 3 that is not perfectly straight but rather has one or more edge anomalies 4. These edge anomalies 4 can be in the form of small edge rips or tears or can be fibers or the like which extend beyond the edge 3 of the web 1. It will be understood that the edge anomaly 4 depicted in FIG. 1 is representative of a number of possible anomalies which may exist on the edge 3 of the web 1.

The web 1, whose position is being delimited by the edge 3 having anomalies 4, is placed into a bundle 6 of a light beams formed by an optical system 7. This bundle 6 of light beams emanates form a light source 8 and impacts on the photoelectric receiver 2. The edge 3, or a shadow of the edge 3 of the web 1, is pictured on the photoelectric receiver 2 in an imaging plane 11 by utilization of an optical component 9 or of a system of optical components in such a way that the image is clear in a transverse imaging scale in a transverse axis 12 extending perpendicularly to the edge 3 of the web 1, and is blurred and diffused in a longitudinal imaging scale in a longitudinal axis 13 extending parallel with the edge 3 of the web 1.

The transverse imaging scale is not necessarily equal to the longitudinal image scale of the optical system 7. In a particularly advantageous manner, the transverse imaging scale can be one to one, and because in this, the conversion of measurements corresponding to the transverse imaging scale can be omitted. The edge 3 of the web 1 is evaluated over a selectable measuring width b3 which may be, for example, b3=0.5 mm to 10 mm, and which can be defined by means of a diaphragm 19. This measuring width b3 of the edge 3 of the web 1 is imaged blurred or distorted in the imaging plane 11 in the direction of the longitudinal axis 13 by means of the optical device.

A CCD (charge-coupled device) line sensor 2, that is generally known, can be employed as a photoelectric receiver 2 and is provided with a plurality of photoelectric elements. This CCD line sensor 2 can consist of, for example, 1728 measuring elements that are arranged in a line. These measuring elements have a size of 10 µm×13 µm, for example, and a center distance between two measuring elements is 10 µm, i.e. there are 100 measuring elements in a millimeter. This results in a measuring length 12 of 17.28 mm of the described CCD line sensor 2. The usable working range can, of course, also be less that the measuring range 12. In the subject embodiment the working range corresponds to the measuring length 12.

By means of an electronic evaluation device, not specifically shown, the CCD line sensor 2 provides an analog video signal 14, which has an amplitude path corresponding to the position of the edge 3 of the web 1. In this way, as may be seen in FIG. 2, an amplitude A3 of the area of a length la2 of the CCD line sensor 2 covered by the web 1 can be minimal, for example, while the uncovered area of a length lu2 of the CCD line sensor 2 can provide an amplitude A1 corresponding to the intensity of an illumination device 16. This illumination device 16 is generally part of the optical system 7, referred to previously, and may be seen most clearly in FIGS. 3 and 4.

If the edge 3 of the web 1 now has one or several anomalies 4 in the area of the measuring width b3, these web edge anomalies 4 are also represented correspondingly blurred in the imaging plane 11 in the direction of the longitudinal axis 13, and thus are represented on the CCD line sensor 2. This has the result that, in the area of the anomalies 4, a beam path of the light beam bundle 6 is changed and, depending on the size of the anomaly 4, a corresponding change in the intensity of the illumination device 16 acting on the CCD line sensor 2 is generated. In this way, an amplitude A2 of the video signal 14 corresponding to the width of the anomaly 4 is created. The strength of this amplitude A2 lies between the amplitude A3 in the covered state of the CCD line sensor 2 and the amplitude A1 in the completely uncovered state of the CCD line sensor 2, as long as the anomaly 4 does not occupy the entire measuring width b3. It is now possible, by means of a suitable known electronic device, to determine the position of the edge 3 of the web 1 from this stepped video signal 14. While the amplitude of the video signal A2 will be less than the amplitude of the video signal A1, it will still be greater that the amplitude A3. Only if the width of the anomaly 4 were greater than the measuring width b3 would the amplitude A2 approach, or be reduced to the level of the amplitude A3. So long as video signal amplitude A2 remains greater than amplitude A3, the position of the edge 3 of the web 1 can be accurately determined even if the edge 3 is rendered less than straight by the occurrence of the edge anomalies 4.

The foregoing discussion provides an overview of the apparatus for accomplishing the method of determining the position of web 1 in accordance with the present invention. The following discussion will now deal in greater detail with the structure of the apparatus in accordance with the subject invention.

A first preferred embodiment of the apparatus for executing the method in accordance with the invention, as may by seen most clearly in FIGS. 3 and 4, essentially consists, for example, of an illumination device 16, and object holder 17, and IR filter 18, a diaphragm 19, an imaging lens 21 and a photoelectric receiver, for example a CCD line sensor 2. These elements 16, 17, 18, 19, 21 and 2 are all arranged along an optical axis 20 which is depicted as being generally vertical but need not be. The illumination device 16 essentially consists of an infrared (IR) light source 23 and a condenser 24. The IR light source 23 radiates diffuse light rays 26. A main plane 25 of the condenser 24 is located at a distance a23 which is 2×f24 with respect to the IR light source, 23, which corresponds to twice the focal length f24, for example f24=20 mm of the condenser 24. In the depicted first preferred embodiment a non-spherical lens is used as the condenser 24. The condenser 24 can also consist of several lenses, for example a combination of a concave-convex lens and one or several non-spherical lenses.

The condenser 24 focuses the light rays 26 at a distance a19=2×f24, at which distance the diaphragm 19 is situated. The imaging lens 21 is located after the diaphragm 19 and has a first focal length fq21, for example fq21=10 mm, in a transverse axis extending perpendicularly in respect to the edge 3 of the web 1, and a second focal length fl21 in a longitudinal axis 13 extending parallel with the edge 3 of the web 1. The object holder 17, which supports the web 1, is disposed between the condenser 24 and the imaging lens 21 in such a way that the edge 3 of the web 1 to be measured lies at an object width g30 with respect to the main plane 30 of the imaging lens 21. The imaging plane 11 of the CCD line sensor 2 is disposed at an image width b30 with respect to the main plane 30 of the imaging lens 21. The imaging plane 11 of the CCD line sensor 2 is disposed at an image width b30 with respect to the main plane 30 of the imaging lens 21. To obtain a clear image, the reciprocal value of the focal length fq21 must result in the sum of the reciprocal values of the object width g30 and the image width b30, i.e. 1/fq21=1/g30+1/b30.

A plane-parallel glass plate 17, as seen in FIGS. 3 and 4, is provided as the object holder 17. The diaphragm 19 has a diaphragm opening 27 of a width of b27 and a length of l27. This diaphragm 19, and the filter 18, for example an IR filter, are disposed in front of or before in the direction of travel of the light beam, the imaging lens 21. The measuring width b3 at the edge 3 of the web 1 is determined by the projected length l17 of the diaphragm opening 27 of the diaphragm 19 with respect to the CCD line sensor 2. In the first preferred embodiment, the imaging lens 21 is embodied in the form of a cylindrical lens 21 which is arranged in light rays 28 at the object width g30=2×fq21 in respect to the glass plate 17 in such a way that its plane side 29 lies parallel with the glass plate 17 and its longitudinal axis 31 is parallel with the edge 3 of the web 1 to be measured. In place of an imaging lens 21 it is also possible to employ a lens system consisting of several lenses.

The CCD line sensor 2 is located in the imaging plane 11 perpendicularly to the edge 3 of the web 1 to be measured and thus generally parallel to the plane of web 1, and is after, in the direction of travel of the light beam, or behind the cylindrical lens 21 at the image width b30=2×fq21, i.e. again at twice the focal length fq21 of the cylindrical lens 21. In this way there is a transverse imaging scale of one to one in this first preferred embodiment.

The edge 3 of the web 1 to be measured is placed parallel with the longitudinal axis 31 of the cylindrical lens 21 and is moved into the light rays 6 on the plane-parallel glass plate 17, so that it is located at the object width g30. A portion of the light rays 6 striking the edge 3 of web 1 are deflected by web edge 3 to form light rays 28 and are passed on in a diffused manner. The light rays 28 emanating form the edge 3 to be measured impinge on the diaphragm opening 27. Only the portion of the light rays 28 impinging on the diaphragm opening 27 passes through the diaphragm 19 and strikes the cylindrical lens 21. The width b27, for example b27=0.1 mm to 2 mm, and the length l27, for example l27=0.2 mm to 10 mm, of the diaphragm opening 27 are respectively less than a width b21, b21=9 mm, and a length l21, for example l21=18 mm, of the cylindrical lens 21. The light rays 28 and thus the edge 3 of the web 1 to be measured are imaged clearly, but mirror-reversed, in the direction of the transverse axis 12 on the CCD line sensor 2 through the cylindrical lens 21. The diffuse light rays 28 impinging on the cylindrical lens 21 are deflected in the direction of the longitudinal axes 13 or 31 in such a way, that a diffused, blurred image of the edge 3 is generated on the CCD line sensor 2. If the edge 3 of the web 1 to be measured has anomalies 4 located in the range of the CCD line sensor 2, these anomalies 4 are imaged exactly and mirror-reversed in the direction of the transverse axis 12 of the cylindrical lens 21, but diffused along the longitudinal axes 13 or 31 of the cylindrical axis 21. Thus only a portion of the light rays imaging the anomalies 4 strikes the CCD line sensor 2 along the longitudinal axis 13. Simultaneously a portion of the "free" light rays not affected by the anomalies 4 also strikes the CCD line sensor 2. An area of reduced intensity is thereby created on the CCD line sensor because of the anomalies 4, and this area of reduced intensity causes a previously described, stepped video signal, which is evaluated by an electronic device.

A second preferred embodiment of an apparatus for executing the method of the present invention, as may be seen in FIGS. 5 and 6, essentially again comprises the illumination device 16, the object holder 17, the filter 18, a diaphragm 32, an imaging lens 33 and the photoelectric receiver, for example a CCD line sensor 2. These elements 16, 17, 18, 32, 33 and 2 are arranged along an optical axis 20, corresponding to the first device.

The diaphragm 32 is disposed at a distance a32=2×f24 with respect to the main plane 25 of the condenser 24. The diaphragm 32 has a slit-like diaphragm opening 34 of a length l34, for example l34=0.2 mm to 10 mm, and a width b34, for example b34=0.1 mm to 2 mm. The length l34 extends parallel with edge 3 of the web 1 to be measured.

The imaging lens 33 is a spherical lens 33. Spherical lenses 33 have so-called aberrations which has the result that a focal length f33, for example f33=10 mm, is exact only along the optical axis 20. Outside of this range, a focal length f33' diverges from this exact value and the focal length f33' is concentrically reduced toward the outside, starting at the optical axis 20. It is also possible to utilize a lens system consisting of several lenses in place of an imaging lens 33.

The object holder 17 in this second preferred embodiment is disposed between the condenser 24 and the spherical lens 33 in such a way that the edge 3 of the web 1 to be measured is placed at an object width g37 with respect to a main plane 37 of the spherical lens 33. The image plane 11 of the CCD line sensor 2 is disposed at a distance with respect to the main plane 37 of the spherical lens 33 corresponding to an image width b37. To obtain a clear image, the reciprocal value of the focal length f33 must result in the sum of the reciprocal values of the object width g37 and the image width b37, i.e. 1/f33=1/g37+1/b37. The spherical lens 33 is disposed at the object width g37, which, for example, corresponds to twice the focal length f33, from the object holder 17. The CCD line sensor 2 is located in the image plane 11 behind the spherical lens 33 at the image width b37, for example b37=2×f33, wherein a transverse image scale of one to one again results in this second preferred embodiment of the method and apparatus for measuring a position of webs or sheets in accordance with the present invention.

The edge 3 of the web 1 to be measured, or whose position is to be determined, in placed into the light rays 6 of the illumination device 16 by being supported on the object holder 17. A portion of the light beam 6 striking the edge 3 of web 1 is deflected as light rays 36 and these light rays 36 are passed on in a diffused manner. The light rays 36 emanating at the edge 3 to be measured pass through the diaphragm opening 34. The portion of the light rays 36 penetrating the diaphragm opening 34 strikes the spherical lens 33. The light rays 36 in the immediate vicinity of the optical axis 20 are clearly represented by the spherical lens 33 on the CCD line sensor 2 in a mirror-reversed manner. In the direction of the transverse axis 12, the light rays 36 are restricted to a narrow area around the optical axis 20 by the slit-shaped diaphragm 32, while parallel with the edge 3, i.e. in the direction of the longitudinal axis 13, the light rays also penetrate the spherical lens 33 in the areas remote from the optical axis 20. The focal length f33' is shortened in these area, so that a diffused, blurred image of the edge 3 is created in the direction of the longitudinal axis 13.

Figure 2:
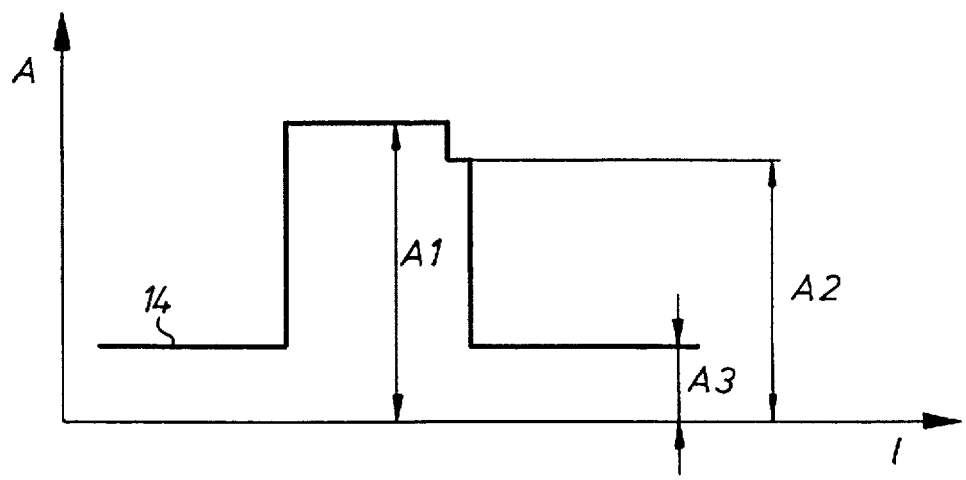
FIG. 2 is a graph showing the relative strengths of video signals which correspond to the position of the web.

If the edge 3 of the web 1 to be measured has anomalies 4 located in the range of the CCD line sensor 2, these anomalies 4 are imaged exactly and mirror-reversed perpendicularly with respect to the edge 3, but are imaged diffused and blurred parallel to the edge 3. Thus a portion of the light rays imaging the anomalies 4 strikes the CCD line sensor 2 parallel with the edge 3, while simultaneously a portion of the "free" light rays not affected by the anomalies also strikes the CCD line sensor 2. Because of this engagement of the light rays 36 with the CCD sensor 2, an area of reduced intensity is created on the CCD line sensor 2 because of the anomalies 4. This is converted into the stepped video signal that is depicted in FIG. 2 and which can then be evaluated by a suitable electronic device to provide an accurate measurement of the location of the edge 3 of the web 1, even if the web is not uniform or straight because of the existence of edge anomalies.

While preferred embodiments of a method and apparatus for measuring a position of webs or sheets in accordance with the present invention have been set forth fully and completely hereinabove, it will be apparent to one of skill in the art that a number of changes in, for example, the type of printing press with which this apparatus is used, the means for transporting the webs or sheets, the width of the webs or sheets and the like could be made without departing from the true spirit and scope of the present invention which is accordingly to be limited only by the following claims.

What is claimed is:

1. A method for measuring the position of an edge of a web including:

generating a light beam using an illuminating device;

providing a photoelectric receiver having a plurality of photoelectric elements arranged at short distances from each other in an imaging plane in a path of said light beam;

including a light source and a light condenser in said illuminating device, said light condenser focusing said light beam at a condenser focus point;

positioning an optical system between said illuminating device and said photoelectric receiver;

situating an imaging lens intermediate said light condenser and said photoelectric receiver;

locating said web edge in said focusing light beam between said light condenser in said illuminating device and said imaging lens; and using said optical system for defining said edge of said web clearly in said imaging plane in a direction of a transverse axis extending perpendicularly to said edge of said web and for defining said edge of said web diffused and blurred in said imaging plane in a direction of a longitudinal axis extending parallel with said edge of said web.

2. The method of claim 1 further including providing said optical system for providing an image in said direction of a transverse axis at a scale of one to one whereby a transverse imaging scale of said optical system is one to one.

3. An apparatus for measuring the position of an edge of a web comprising:

an illuminating device emitting a light beam, said illuminating device including alight source and a light condenser, said light condenser focusing said light beam at a condenser focus point;

a photoelectric receiver positioned to receive said light beam, said photoelectric receiver including a plurality of photoelectric elements arranged at short distances from each other in an imaging plane in a path of said light beam;

means to support said edge of said web, said web edge support means being positioned in said light beam intermediate said light condenser and said condenser focus point; and an optical system having at least one imaging lens, said optical system defining said edge of said web clearly on said photoelectric receiver in said imaging plane in a direction of a transverse axis extending perpendicularly to said edge of said web, and defining said edge of said web diffused and blurred in said imaging plane in a direction of a longitudinal axis extending parallel to said edge of said web, said imaging lens having a first focal length in said transverse axis and a second focal length different from said first focal length, said imaging lens having a main plane spaced from said web by an object width and spaced from said imaging plane by an image width, a reciprocal of said first focal length being a sum of a reciprocal of said object width plus a reciprocal of said image width.

4. The apparatus of claim 3 wherein said imaging lens is a cylindrical lens having a longitudinal axis extending parallel with said edge of said web.

5. The apparatus of claim 3 wherein said means to support said edge of said web includes an object holder supporting said web, said object holder being a glass plate and further including a diaphragm having a diaphragm opening, said diaphragm being positioned between said object holder and said imaging lens.

6. The apparatus of claim 5 wherein said diaphragm opening has an opening length and an opening width and further wherein said cylindrical lens has a lens length and lens width, said diaphragm opening length and width being less than said cylindrical lens length and width.

7. The apparatus of claim 3 wherein said main plane of said imaging lens is disposed at an image distance from said photoelectric receiver which is twice said first focal length of said imaging lens.

8. The apparatus of claim 3 wherein said means to support said edge of said web includes an object holder supporting said web, said object holder being a glass plate, said object holder being spaced form said imaging lens at a spacing distance equal to twice said first focal length of said imaging lens.

9. The apparatus in accordance with claim 8 further including an IR filter disposed between said glass plate and said imaging lens.

10. The apparatus of claim 3 wherein said light condenser has a condenser main plane and a condenser focal length, said light source being positioned at a distance corresponding to twice said condenser focal length from said condenser main plane.

11. The apparatus of claim 3 wherein said photoelectric receiver is a CCD line sensor.

12. An apparatus for measuring the position of an edge of a web comprising:

an illuminating device emitting a light beam, said illuminating device including a light source and a light condenser, said light condenser focusing said light beam at a condenser focus point;

a photoelectric receiver positioned to receive said light beam, said photoelectric receiver including a plurality of photoelectric elements arranged at short distances from each other in an imaging plane in a path of said light beam;

an optical system having an imaging lens, said optical system defining said edge of said web clearly on said photoelectric receiver in said imaging plan in a direction of a transverse axis extending perpendicularly to said edge of said web and defining said edge of said web diffused and blurred in said imaging plane in a direction of a longitudinal axis extending parallel to said edge of said web, said imaging lens having an optical axis and having a uniform value of its focal length in a first area around said optical axis and has differing values of its focal length in a second area outside of said first area, said imaging lens having a main plane spaced form said web by an object width and spaced from said imaging plane by an image width; and a diaphragm having a slit-like diaphragm opening with an opening length and an opening width, said diaphragm being positioned adjacent, and before, in the direction of travel of said light beam, said imaging lens, a reciprocal of said focal length of said imaging lens being a sum of a reciprocal of said object width plus a reciprocal of said image width.

13. The apparatus of claim 12 wherein said imaging lens is a spherical lens.

14. The apparatus of claim 12 wherein said diaphragm opening width is between 0.2 mm to 2 mm and further wherein said diaphragm opening length is greater than 2 mm.

15. The apparatus of claim 12 wherein said main plane of said imaging lens is disposed at an image distance from said photoelectric receiver which is twice said focal length of said imaging lens.

16. The apparatus of claim 12 further including an object holder supporting said web, said object holder being a glass plate, said object holder being spaced from said imaging lens at a spacing distance equal to twice said focal length of said imaging lens.

17. The apparatus in accordance with claim 16 further including an IR filter disposed between said glass plate and said imaging lens.

18. The apparatus of claim 12 wherein said light condenser has a condenser main plane and a condenser focal length, said light source being positioned at a distance corresponding to twice said condenser focal length from said condenser main plane.

19. The apparatus of claim 12 wherein said photoelectric receiver is a CCD line sensor.

* * * * *